Patented Aug. 23, 1938

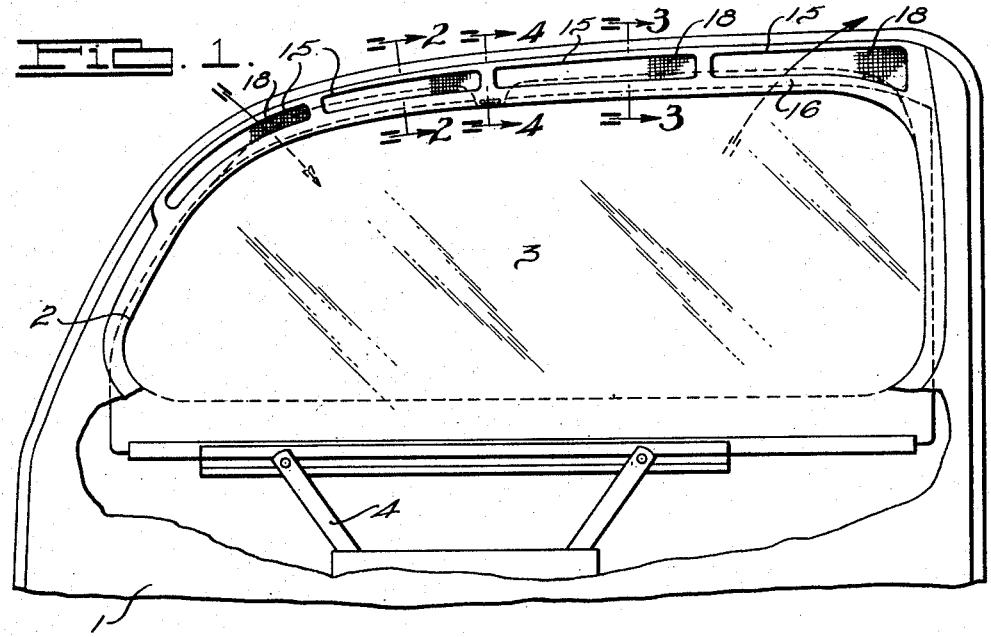
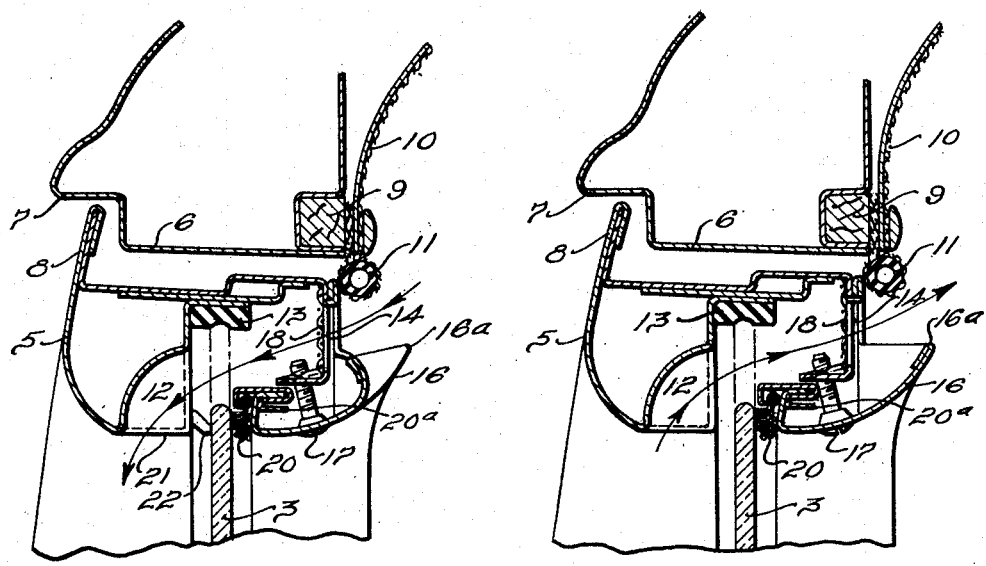

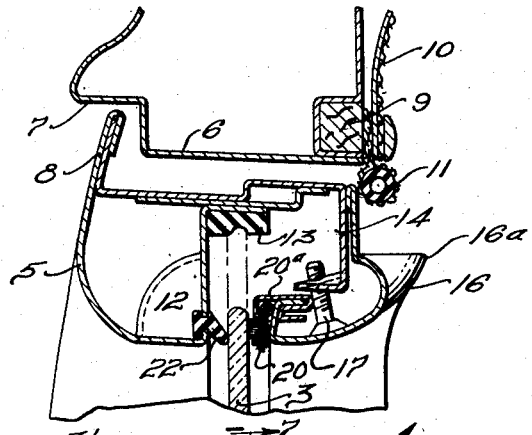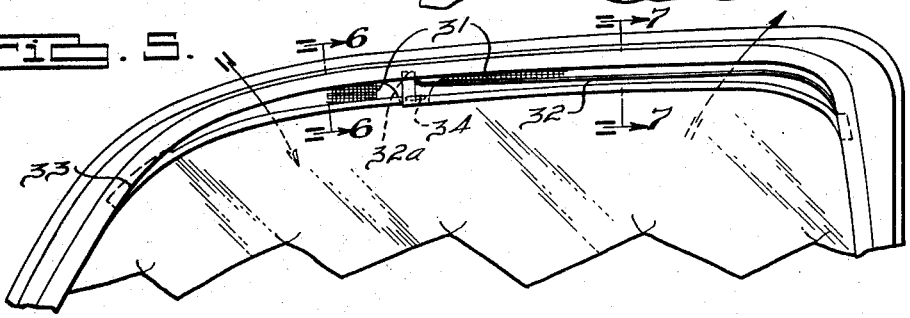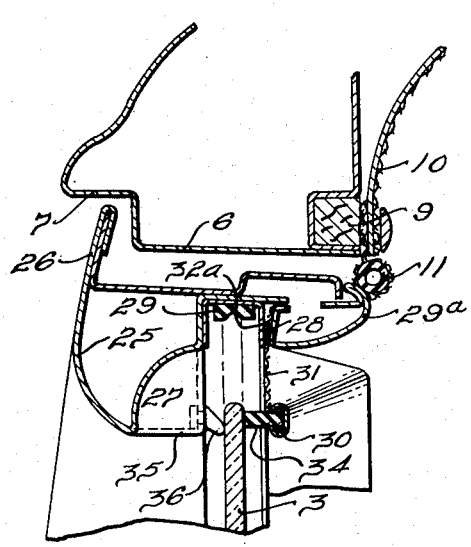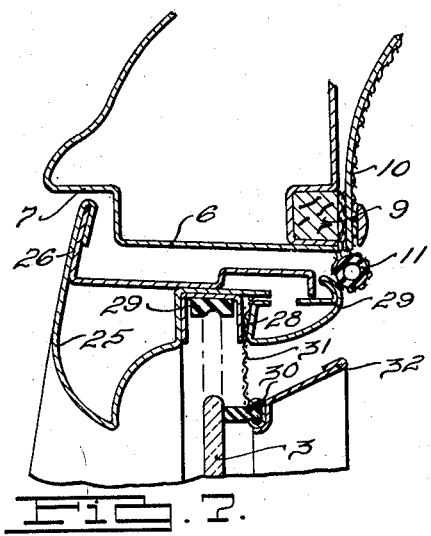

2,127,971

UNITED STATES PATENT OFFICE 2,127,971

VEHICLE BODY VENTILATION

Otto F. Graebner, Detroit, Mich., assignor to The Murray Corporation of America, a corporation of Delaware Application August 30, 1935, Serial No. 38,585

4 Claims. (Cl. 296—44)

This invention relates generally to means for ventilating the interior of automobiles. It relates to that general class of automobiles which have doors having window openings therein and vertically adjustable windows serving to close said openings.

The primary object of the present invention is to provide means extending through the door frame by which the interior of an automobile may be ventilated, at the same time preventing the access of rain and foreign matter into the interior of the automobile with the circulated air.

The invention contemplates the provision of a long substantially continuous slot located in the upper portion of the door frame above the window opening therein. This slot is formed as an integral portion of the door frame and communication through the slot is controlled by adjustment of the window sliding in the window opening in the door.

It has been found that as an automobile moves along, the eddies or air currents formed thereby tend to force air inwardly towards the automobile at the rear portion of the door and create an area of slightly lower pressure at the forward portion of the door. Consequently, it has been found that by provision of a relatively long slot throughout substantially the entire length of the door, air will circulate toward the interior of the automobile at the rearward portion of the slot and will be expelled from the interior of the vehicle at the forward portion of the slot.

Still further, an object of the invention is to provide a ventilating means which will prevent the ventilation from causing a draft on those within the automobile.

Yet another object of the invention consists in the provision of filtering means for preventing the circulation of foreign matter with the circulated air.

Still further, the invention contemplates the provision of ventilating means of this generic type which may be formed as an integral portion of the door and yet not materially alter the exterior appearance of the vehicle to which the apparatus of the present invention has been applied.

Many other and further objects of the invention will become apparent from consideration of the following specification when considered in the light of the accompanying drawings.

In the drawings:

Figure 1 is an interior view of the upper portion of a door embodying the improved ventilating means;

Fig. 2 is a sectional view taken on the line 2—2 of Fig. 1, looking in the direction of the arrows;

Fig. 3 is a sectional view taken on the line 3—3 of Fig. 1, looking in the direction of the arrows;

Fig. 4 is a sectional view taken on the line 4—4 of Fig. 1, looking in the direction of the arrows;

Fig. 5 is a fragmentary interior view of the upper portion of the door showing a modified form of the invention;

Fig. 6 is a sectional view taken on the line 6—6 of Fig. 5;

Fig. 7 is a sectional view taken on the line 7—7 of Fig. 5.

With more particular reference to the drawings, the specific embodiment of the invention herein shown comprises a door 1 having a window opening 2 therein. A window 3 is mounted for vertical movement in the door by means of the conventional door lift mechanism 4.

The upper frame member of the door above the window opening is shown in detail in the sectional view in Figs. 2, 3 and 4. This frame member as is shown in the present embodiment of the invention, is formed of sheet metal and comprises in general an outer portion 5 of hollow section.

In each of the sectional views it will be noted that the upper portion of the door frame is illustrated in connection with the conventional jamb portion 6 of the body panel. This portion of the body panel is conventional in construction and comprises in general a rabbeted portion 7 into which an extending flange 8 of the door is adapted to fit. The interior portion of the body panel is formed with the conventional tacking strip 9 to which is secured the inner upholstery 10 of the roof covering and a resilient finish bead 11 serving to insure tight closure of the door.

Formed in the outer portion of the door frame 5 is a downwardly opening vent 12. In the central portion of the door near the upper edge thereof is seated a resilient strip 13 which serves as a limit stop and seating member for the window when in completely raised position. The door frame member is carried inwardly of the limit stop 13 and then bent downwardly to form a continuous flange 14 extending substantially throughout the length of the door. This flange 14 has a plurality of elongated openings 15 formed therein and serves to carry a finish molding 16 secured thereto by means of a plurality of screws 17.

This finish molding 16, as will be seen in the sectional views, extends substantially throughout the length of the door and throughout the length of the flange 14. It will be noted that the rear portion of this finish molding is provided with an upturned lip 16a which deflects air drawn in through the rearward portion of the slot in an upward direction toward the roof of the interior of the car. The elongated slots 15 in the flange 14 are each covered by a piece of mesh, screen or filter material 18 which serves to filter the air coming into and passing out of the interior of the car.

Throughout its length the finish molding 16 has secured thereto a fabric strip 20 by means of a plurality of clips 20a. This fabric strip has a nap surface which serves to engage the inner surface of the window 3.

It will be apparent from the construction defined above that the upper frame portion of the door is provided with a relatively long, substantially continuous slot or vent at the upper portion of the door. It will be seen that this vent is provided throughout its length with a screening or filtering material 18 which serves to exclude foreign matter. It will be further seen that throughout its entire length, this vent opens downwardly on the outboard side of the door to prevent the admission of rain and on the inboard side of the door the rear portion of the vent is opened upwardly and the forward portion of the vent opens laterally directly into the interior of the car.

As the car moves along the eddies set up by the movement of the car through the air will force the air into the slot in the rear portion thereof and this air will then be deflected upwardly by means of the lip 16a on the finish strip 16. Due to the low pressure of air existing adjacent the outside, forward end of the vent, the air from the interior of the car will be drawn outwardly through the forward end of the vent and thus expelled from the interior of the automobile.

At a suitable point substantially centrally of the window opening, the door may be preformed to provide a projection 21 on which is mounted a resilient member 22 adapted to guide the window during movement.

In the modified form of the invention shown in Figs. 5, 6 and 7, the function and operation of the apparatus are substantially the same as has been described in connection with the preceding figures; however, the structural features are slightly different. The door jamb on the body panel, being identical with that shown in the preceding figures, has been designated by similar reference characters. This structure of this door jamb is conventional and forms no part of the present invention.

The exterior portion of the door frame is substantially similar to that described in connection with this preceding figure, comprising an outer member 25 of hollow section, having an upwardly extending flange 26 adapted to fit into the rabbeted portion 7 of the door jamb 6. This outer portion of the door 25 is provided with a downwardly opening vent 27 similar to the vent 12 described in connection with the preceding figures. The central portion of the door frame is provided with a channel 28 in which is seated a limit stop 29 of resilient material. The finish molding which is secured to the interior of the door frame by any suitable means comprises an upper rail 29a and a lower rail 30 having a screen or filter 31 extending therebetwen. The rear portion of the lower rail 30 is provided with a baffle 32 serving to deflect air upwardly toward the upper portion of the interior of the car. This baffle is carried from the rear portion of the door to substantially the middle area thereof and is at this point secured to the upper rail by means of the lug 32a, seen in Fig. 5. Throughout the forward portion of the vent the rail 30 is relatively narrow and serves only as a means to secure the lower edge of the screen 31, and define the lower opening of the vent. This lower rail 30 is joined to the frame member of the door at its forward end at points designated by reference 33.

The screening is secured to the upper rail member 29 by any suitable means. As is seen in the sectional views in Figs. 6 and 7, the lower rail 30 is formed of outwardly presenting channel into which the screen 31 is crimped and held by means of a resilient guide strip 34 extending throughout the length of the lower rail. Likewise, carried by a depression 35 in the outer member of the door frame is a resilient guide member 36 similar to the guide member 22 which serves jointly with the guide member 34 to guide the movement of the window 3 during vertical adjustment.

From the foregoing it will be seen both of the modifications of the invention herein disclosed accomplish the same result and function in similar manner. The fundamental distinction between them is that in the form of the invention illustrated in Figs. 1-4 the inner openings of the vent are defined by the openings 15 in the flange 14 which is formed as an integral portion of the door frame and that the screening 18 is carried by this flange, while in the form of the invention shown in Figs. 5-7 the openings of the vent to the interior of the car are formed in the interior finish molding and the screening 31 is carried by this molding.

It will be apparent from the foregoing that the invention disclosed herein provides relatively simple means for ventilating the interior of an automobile.

Further it will be appreciated that the ventilating slot is of such construction that it serves to provide a complete circulation of air throughout the interior of the automobile without causing unpleasant draft. It will be seen that the downwardly opening vents 12 and 27 serve to prevent the access of rain to the interior of the automibile, and further the screens 31 and 14 serve to prevent the introduction of any amount of foreign matter with the incoming air.

It will be appreciated that the construction herein disclosed provides a relatively simple method of ventilation which does not materially alter the outward appearance of the automobile.

Many other and further modifications of the invention herein disclosed will be apparent to those skilled in the art.

I claim:

1. In an automobile door having a window opening, a transverse slot extending through said door above said window opening to permit the circulation of air to the interior of the car, a finish molding secured to the interior side of the door cooperating with said slot and carrying screening to filter the circulated air.

2. In an automobile door having a window opening, a transverse slot extending through said door above said window opening to permit the circulation of air to the interior of the car, a finish molding secured to the interior of said door frame, and a baffle carried by said finish molding for directing the incoming air upwardly.

3. A vehicle door having the outer paneling at the top of the window opening preformed to provide overhanging portions spaced outwardly from the window opening and a portion between said overhanging portions preformed inwardly and providing means for mounting a guide for the window in said door.

4. A vehicle door construction formed of sheet metal and having a window opening therein, the metal of said door adjacent the upper portion of the window opening being bent downwardly in substantially the plane of the door and having an inturned flange at its lower marginal edge, said downwardly bent portion being cut out to provide ventilating apertures therein, and a decorating garnish molding secured in position upon said inturned flange, said garnish molding being provided with an upwardly flared portion adjacent its rear end in order to direct air entering through said apertures upwardly toward the roof of the vehicle.

OTTO F. GRAEBNER.